United States Patent
Usui (10) Patent No.: US 9,999,990 B2
(45) Date of Patent: *Jun. 19, 2018

(54) MOLDING MATERIAL USING SAPONIFIED ETHYLENE-VINYL ESTER-BASED COPOLYMERS

(71) Applicant: THE NIPPON SYNTHETIC CHEMICAL INDUSTRY CO., LTD., Osaka (JP)

(72) Inventor: Shintaro Usui, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/193,291

(22) Filed: Jun. 27, 2016

(65) Prior Publication Data

US 2016/0303768 A1    Oct. 20, 2016

Related U.S. Application Data

(63) Continuation of application No. PCT/JP2015/050263, filed on Jan. 7, 2015.

(30) Foreign Application Priority Data

Jan. 14, 2014 (JP) .................................. 2014-003881

(51) Int. Cl.
| | |
|---|---|
| *B29B 9/12* | (2006.01) |
| *C08L 29/04* | (2006.01) |
| *B29B 9/06* | (2006.01) |
| *B29B 7/46* | (2006.01) |
| *B29K 23/00* | (2006.01) |
| *B29K 105/00* | (2006.01) |

(52) U.S. Cl.
CPC ................ *B29B 9/12* (2013.01); *B29B 9/065* (2013.01); *C08L 29/04* (2013.01); *B29B 7/46* (2013.01); *B29K 2023/086* (2013.01); *B29K 2105/0067* (2013.01); *C08L 2205/025* (2013.01)

(58) Field of Classification Search
CPC ....... B29C 47/0011; B29B 9/12; B29B 9/065; C08L 29/04
USPC ......................................................... 524/524
See application file for complete search history.

(56) References Cited

U.S. PATENT DOCUMENTS

| | | | |
|---|---|---|---|
| 5,265,507 A | 11/1993 | Noda et al. | |
| 6,686,405 B1 | 2/2004 | Kawahara et al. | |
| 7,323,503 B2 | 1/2008 | Kawahara et al. | |

FOREIGN PATENT DOCUMENTS

| | | |
|---|---|---|
| EP | 2592114 A1 | 5/2013 |
| JP | H03-61507 A | 3/1991 |
| JP | 2000-264972 A | 9/2000 |
| JP | 2001-096530 A | 4/2001 |
| JP | 2007-313892 A | 12/2007 |
| JP | 2013-181105 A | 9/2013 |

OTHER PUBLICATIONS

International Search Report issued with respect to application No. PCT/JP20151050263, dated Apr. 7, 2015.
International Preliminary Report on Patentability issued with respect to application No. PCT/JP20151050263, dated Jul. 19, 2016.
Extended European Search Report from Patent Application No. 15737836.5 dated Oct. 12, 2017.

*Primary Examiner* — Deve E Valdez
(74) *Attorney, Agent, or Firm* — Greenblum & Bernstein, P.L.C.

(57) ABSTRACT

Provided is a melt-molding material using saponified ethylene-vinyl ester-based copolymer (EVOH resin), and has excellent feed property during melt extrusion molding. The molding material consists of EVOH resin pellets comprising a first EVOH resin pellet having approximately circular or elliptical cross section and a second EVOH resin pellet having a cylindrical shape. The ratio in weight of the first EVOH resin pellet (A1) to the second EVOH resin pellet (A2), A1/A2, is from 99/1 to 20/80.

12 Claims, 3 Drawing Sheets

MOLDING MATERIAL USING SAPONIFIED ETHYLENE-VINYL ESTER-BASED COPOLYMERS

This application is a Continuation of PCT/JP2015/050263 filed Jan. 7, 2015, and claims the priority benefit of Japanese application 2014-003881 filed Jan. 14, 2014, the contents of which are expressly incorporated by reference herein in their entireties.

TECHNICAL FIELD

The present invention relates to a molding material consisting of saponified ethylene-vinyl ester-based copolymer (hereinafter, referred to as "EVOH resin") pellets, in particular, relates to a molding material consisting of EVOH resin pellets and exhibiting excellent feed property in melt extrusion molding.

BACKGROUND ART

EVOH resin has a high crystallinity due to firmly hydrogen bonding between hydroxyl groups in its polymer chain, therefore exhibiting strong intermolecular force. Not only crystal part but also amorphous part in EVOH resin can exhibit strong intermolecular force. This provides EVOH resin film with excellent gas-barrier property.

EVOH resin is utilized for packaging film or sheet, or container such as bottle for food, pharmaceutical, industrial medicine, agricultural chemicals, and so on, because of the excellent gas-barrier property. EVOH resin for molding these articles are commonly distributed in the form of pellet having a length of about 1 to about 10 mm.

In general, EVOH resin pellets are produced by strand pelletizing process. As disclosed in, for example, JP H3-61507A (patent document 1), the strand pelletizing process comprises extruding a solution in which EVOH resin (or its composition) is dissolved in a solvent into a coagulating bath through the metal plate outlet having a hole of 1 to 5 mm in diameter, or extruding a molten resin through die, and converting the molten resin into a rod-shaped strand by cooling, followed by cutting the strand at appropriate intervals of distance. Thus EVOH resin pellets are obtained.

The strand pelletizing process has a difficulty in cutting large quantity of resin at accurate intervals for a short time. In order to solve the difficulty associated with strand pelletizing process, for example, JP2001-96530A (patent document 2) suggests a hot-cut pelletizing process in which EVOH resin melt containing water is cut immediately after coming from the extruder. The hot-cut pelletizing process is classified into air hot-cut pelletizing process and underwater pelletizing process. The air hot-cut pelletizing process produces pellets by cutting EVOH resin melt containing water with rotating cutter immediately after coming from outlet of a twin-screw extruder. The underwater pelletizing process produces pellets by extruding EVOH resin to a chamber equipped with cutter and filled in cooling water, followed by cutting in the water immediately.

Thus produced EVOH resin pellets have a variety of properties and shapes depending on their pelletizing process.

In the case of melt-molding EVOH resin pellets, properties and shapes of the pellets are also important for improving accuracy of dimensions in their molded article because shapes of the molded article, and the accuracy of dimensions including thickness are affected by shapes of the pellets.

JP2000-264972A (patent document 3) discloses an invention which is completed by focusing on that properties of EVOH resin pellets affects torque variation and discharge amount in melt extrusion molding, and thickness variation of film as a molded product. The invention suggests adjusting angle of repose of pellets to the range of 30 to 45°, wherein the angle of repose is defined as a ratio of the horizontal surface to the height of the conical pile of pellets formed by pouring pellets onto the horizontal surface.

The patent document 3 discloses in examples that torque variation and discharge amount variation in melt-molding and thickness variation of the resulting film has a relation with the angle of repose of cylindrical EVOH resin pellets produced by strand pelletizing process.

In particular, a molding material of cylindrical pellets have an angle of repose in the range of 33 to 38°, wherein the pellets are produced by extruding EVOH resin solution containing EVOH resin through a cylindrical nozzle to convert into strand, and making the strand stay in a coagulation bath for 60 to 120 seconds, followed by cutting the strand into cylindrical pieces and drying the pieces. The EVOH resin contained in the solution has ethylene unit content of 35 mol % (Examples 1 and 4), 42 mol % (Examples 2 and 5), and 30 mol % (Example 3). This molding material reduced torque variation, discharge amount variation, and film thickness variation, whereas EVOH resin pellets of Comparative Examples 1 and 2 exhibited remarkably large torque variation, discharge amount variation, and film thickness variation. The comparative examples 1 was cylindrical EVOH resin pellets having angle of repose of 46°, which were produced in the same manner as examples except changing staying time in the coagulation bath to 10 minutes. The comparative example 2 were EVOH resin pellets coated with 1200 ppm of lubricant and had angle of repose of 28°. EVOH resin used for pellets in comparative examples was EVOH resin having ethylene unit content of 35 mol %.

PRIOR ART

Patent Document

[Patent document 1] JP H3-61507A
[Patent document 2] JP2001-96530A
[Patent document 3] JP2000-264972A

SUMMARY OF THE INVENTION

Technical Problem to be Solved by the Invention

The production method suggested in the Patent document 2 can treat a large quantity of resin and cut resin melt at intervals of precisely given length to produce pellets highly uniform in their dimensions effectively. However, thus produced pellets were not evaluated for a molding material to be melt-molded.

In the patent document 3, EVOH resin pellets were evaluated for properties of a molding material to be melt-molded including torque variation, discharge amount variation, and thickness variation of film produced therefrom. Recently, a new problem has been raised when the pellets were fed to a melt extruder. The problem is vibration of the screw when resin melt flows in the melting plasticating section of the extruder, and noise emission caused from torque vibration when extruding the resin melt. However, the problem was not evaluated in the patent document 3.

The noise emission in the melting plasticating section of the melt extruder is caused from an overload on the screw, and in the worse case, screw might become worn, and abrasion powder might come to be mixed in the molten resin.

Under these situations, the object of the present invention is to provide EVOH resin pellets excellent in feed property as a melt-molding material.

Means for Solving the Problems

The present inventor has focused on shapes and pelletizing processes of EVOH resin pellets and reviewed the relation with feed property of the pellets in melt extruder, thereby accomplishing the invention.

The molding material using saponified ethylene-vinyl ester copolymer of the invention is a molding material consisting of saponified ethylene-vinyl ester copolymer pellets. The pellets comprises a first saponified ethylene-vinyl ester-based copolymer pellet having approximately circular or elliptical cross section, and a second saponified ethylene-vinyl ester-based copolymer pellet having a cylindrical shape, wherein the ratio (A1/A2) in weight of the first saponified ethylene-vinyl ester-based copolymer pellet (A1) to the second saponified ethylene-vinyl ester-based copolymer pellet (A2) is from 99/1 to 20/80.

Preferably, the cross section of the first saponified ethylene-vinyl ester-based copolymer pellet is appropriate circle or ellipse having major axis of 3.0 to 6.0 mm and minor axis of 2.5 to 6.0 mm, and the second saponified ethylene-vinyl ester-based copolymer pellet has 1.5 to 4.0 mm in diameter of its circular bottom face and has 1.5 to 4.0 mm in height.

The molding material has an angle of repose preferably less than 37° of a conical pile of the pellets formed by pouring the pellets to a circular container having 9.5 cm in diameter through a funnel having 8 mm in diameter of its tip The first saponified ethylene-vinyl ester-based copolymer pellet has an ethylene content of preferably 20 to 60 mol %, and the second saponified ethylene-vinyl ester-based copolymer pellet has an ethylene content of preferably 20 to 60 mol %.

Figure 1:
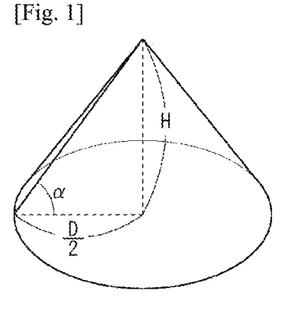
FIG. 1 is an illustration diagram for angle of repose.

In this specification, the angle of repose is defined as angle α in FIG. 1 which is the internal angle between the horizontal surface and the talus surface of conical pile of pellets formed by pouring EVOH resin pellets onto the horizontal surface.

Figure 2:
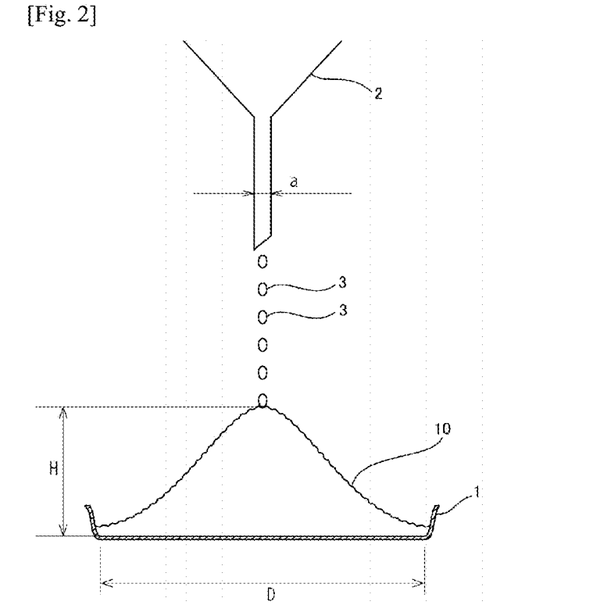
FIG. 2 is an illustration diagram for a measuring method of angle of repose.

As shown in FIG. 2, the conical pile is formed by pouring EVOH resin pellet 3 to the glass container 1 with 9.5 cm in inner diameter (D) and 2 cm in height placed on the horizontal surface through the glass funnel 2 having a tip of 8 mm in diameter (a) set 10 cm upward from the upper face of the container 1 until a pellet slops over the container 1. The height (H) of the conical pile 10 of EVOH resin pellets formed on the horizontal surface of the container is measured and the angle of repose is calculated as arctangent according to the formula below.

$$\text{Angle of repose}(°)=\tan^{-1}(H/4.75)$$

The ethylene unit content in the specification is a measurement value according to, for example, ISO14663.

The saponification degree of vinyl ester component in the specification is a measurement value, which is determined according to, for example, JIS K6726 with the proviso that EVOH resin is dissolved in a mixture of water and methanol, and thus obtained homogeneous solution is measured.

Effect of the Invention

The molding material of the present invention exhibits excellent feed property. Accordingly, the molding material can reduce the overload on melt extruder.

MODE FOR CARRYING OUT OF THE INVENTION

The present invention will be described in detail below. The following is merely description for a typical embodiment and does not restrict the invention.

The molding material of the invention consists of saponified ethylene-vinyl ester-based copolymer (EVOH resin) pellets, which comprises a first EVOH resin pellet having an approximately circular or elliptical cross-section and a second EVOH resin pellet having cylindrical shape.

First, EVOH resin used for pellets will be described below.

<EVOH Resin>

A saponified ethylene-vinyl ester copolymer (EVOH resin) used for the molding material is a saponified ethylene-vinyl ester copolymer which is obtained by copolymerizing ethylene and vinyl ester-based monomer and saponifying the obtained ethylene-vinyl ester copolymer. The EVOH resin is insoluble thermoplastic resin.

In general, vinyl acetate is used for the vinyl ester-based monomer from the viewpoint of economics. Any known polymerization method, for example, solution polymerization, suspension polymerization, emulsion polymerization, or bulk polymerization may be employed for the polymerization, and a common polymerization method is solution polymerization using methanol as a solvent. Continuous system and batch system may be employed for the polymerization.

Copolymerizing ethylene with vinyl ester monomer is usually performed by introducing pressurized ethylene into a polymerization system. Ethylene unit content may be controlled by ethylene pressure, and is commonly selected from the range of 25 to 80 kg/cm$^2$ depending on the desired ethylene unit content.

Saponification of the obtained ethylene-vinyl ester copolymer may be carried out by a known method, where the copolymer in the state of dissolving in alcohol or alcohol containing water, is saponified in the presence of alkali catalyst or acid catalyst.

The EVOH resin thus produced contains ethylene unit and vinyl alcohol structural unit as main constituting units and further contains a bit of vinyl ester structural unit as a left unsaponified unit.

EVOH resin used for the material of EVOH resin pellets may further contain a unit derived from the following comonomer. Examples of the comonomer include α-olefins such as propylene, isobutene, α-octene, α-dodecene, and α-octadecen; hydroxyl group-containing α-olefins such as 3-buten-1-ol, 4-penten-1-ol and 3-buten-1,2-diol; hydroxyl group-containing α-olefin derivatives such as esterified or acylated product of the hydroxyl group-containing α-olefin; unsaturated carboxylic acid, salt thereof, or partially alkyl ester, completely alkyl ester, nitrile, amide, anhydride, unsaturated sulfonic acid or salt thereof, vinylsilane compound, vinyl chloride, styrene, or a like comonomer.

Furthermore, a post-modified EVOH resin such as urethanated, acetalized, cyanoethylated, or oxyalkylenated EVOH resin may also be used.

In such modified EVOH resin, an EVOH resin having a primary hydroxyl group at a side chain introduced by copolymerization is preferred from the viewpoint of improved formability in post-molding process such as stretching process, vacuum- or air-pressure forming. Particularly preferable modified-EVOH resin is EVOH resin in which 1,2-diol structural unit is introduced at the side chain thereof Ethylene unit content of EVOH resin constituting pellets used as a molding material is within the range of 20 to 60 mol %, preferably 25 to 50 mol %, particularly preferably 29 to 48 mol %. The ethylene unit content is unduly low, the resulting molded product, especially stretched film, would exhibit lowered gas-barrier property under high humidity. If the ethylene unit content is unduly high, the stretched film would exhibit lowered gas-barrier property.

The saponification degree of vinyl ester unit of the EVOH resin used for the molding material is in the range of usually from 90 mol % or more, preferably from 93 to 99.99 mol %, particularly preferably from 98 to 99.99 mol %. If the saponification degree is unduly low, the resulting stretched film would be lowered in gas-barrier property and humidity resistance.

The melt flow rate (MFR) at 210° C. and 2160 g load of EVOH resin of the pellets used for the molding material is in the range of usually 1 to 100 g/10 minutes, preferably 2 to 50 g/10 minutes, particularly preferably 3 to 30 g/10 minutes. If the EVOH resin has unduly high MFR, mechanical strength of the molded product therefrom tends to be lowered. If the EVOH resin has unduly low MFR, extrusion processability in molding tends to be lowered.

The conditions of copolymerization are not particularly limited, but usually employ the following conditions.

Examples of the solvent used in the copolymerization include lower alcohols such as methanol, ethanol, propanol, and butanol, and ketones such as acetone and methyl ethyl ketone, and among them, methanol is preferably used in industry.

The amount of the solvent to be used is appropriately determined depending on the desired polymerization degree of the copolymer, with taking account of chain transfer coefficient of the solvent used. In the case of using methanol as the solvent, the ratio of solvent (S) to monomer (M) in weight, S/M, is selected from the range of 0.01 to 10, preferably 0.05 to 7.

Examples of catalyst used in the copolymerization include a known radical polymerization catalyst such as azobisisobutyronitrile, acetyl peroxide, benzoyl peroxide, and lauryl peroxide, as well as low temperature active radical polymerization catalyst including peroxyesters such as t-butyl peroxyneodecanoate, t-butyl peroxypivalate, α,α' bis (neodecanoylperoxy) diisopropyl benzene, cumil peroxyneodecanoate, 1,1,3,3-tetramethyl butylperoxydecanoate, 1-cyclohexyl-1-methyl ethylperoxydecanoate, t-hexylperoxyneodecanoate, and t-hexylperoxypivalate; peroxydicarbonates such as di-n-propylperoxydicarbonate, di-iso-propylperoxydicarbonate, di-sec-butylperoxydicarbonate, bis (4-t-butylcyclohexyl)peroxydicarbonate, di-2-ethoxy ethylperoxydicarbonate, di(2-ethylhexyl)peroxydicarbonate, dimethoxy butylperoxydicarbonate, di(3-methyl-3-methoxy butylperoxy)dicarbonate; diacylperoxides such as 3,3,5-trimethylhexanoyl peroxide, diisobutyryl peroxide, and lauroyl peroxide.

The proper amount of the polymerization catalyst to be used varies depending on the type of catalyst, and is usually selected according to polymerization rate. For example, in the case of using azobisisobutyronitrile or acetyl peroxide, the amount is preferably selected from the range of 10 to 2000 ppm, particularly 50 to 1000 ppm based on vinyl ester-based monomer.

It is preferred that a hydroxyl lactone-based compound or a hydroxycarboxylic acid is used with the catalyst because their copresence can suppress pellet coloration. The hydroxyl lactone-based compound is a compound containing lactone ring and hydroxyl group, and its non-limiting examples include L-ascorbic acid, erythorbic acid, glucono-δ-lactone and so on, but not limited thereto. Preferably L-ascorbic acid and erythorbic acid are used. Examples of hydroxyl carboxylic acid include glycolic acid, lactic acid, glycerin acid, malic acid, tartaric acid, citric acid, and salicylic acid, and citric acid is preferable among them.

In the case of using hydroxyl lactone-based compound or hydroxyl carboxylic acid either in batch process or continuous process, its amount is selected from the range of 0.0001 to 0.1 part by weight, preferably 0.0005 to 0.05 part by weight, further preferably 0.001 to 0.03 part by weight, based on 100 parts of vinyl ester-based monomer. The amount is unduly low, the copresence effect would not be obtained sufficiently. On the contrary, the amount is unduly high, polymerization of vinyl ester-based monomer would be inhibited. When the compound is added to the polymerization system, the compound is usually dissolved in a solvent such as water, lower aliphatic alcohol (e.g. methanol, ethanol, propanol, or tert-butanol), aliphatic ester containing vinyl ester-based monomer (e.g. methyl acetate or ethyl acetate), or mixture thereof, and the obtained solution are fed to the polymerization reaction system.

Copolymerization temperature depends on solvent used or pressure in the system, but copolymerization is commonly conducted at a temperature lower than the boiling point of the solvent, preferably within 40 to 80° C., particularly within 55 to 80° C. The copolymerization temperature is unduly low, the copolymerization reaction takes long time, but the shortened copolymerization time requires a large amount of catalyst. The copolymerization temperature is unduly high, polymerization control would become difficult.

The polymerization time is selected from the range of 4 to 10 hours, preferably 6 to 9 hours in the case of batch process.

If the polymerization time is unduly short, polymerization temperature needs to be elevated or the amount of catalyst needs to be increased. On the contrary, unduly long polymerization time is unpreferred in productivity. In the case of continuous process, average residence time in polymerization reactor is from 2 to 8 hours, preferably 2 to 6 hours. An unduly short residence time requires a higher polymerization temperature or a larger amount of catalyst. An unduly long polymerization time causes a problem in productivity.

Rate of polymerization of vinyl ester-based monomer is set as high as possible within the range controllable in polymerization, preferably within 20 to 90%, from the viewpoint of productivity. Unduly low rate of polymerization causes a problem associated with productivity or increase of unpolymerized vinyl acetate monomer. On the contrary, unduly high rate of polymerization makes polymerization control difficult.

When the rate of polymerization arrives at desired one by polymerization for a given time, if necessary, a polymerization inhibitor is added, and unreacted ethylene gas is removed by its evaporation, followed by removing unreacted vinyl ester.

After removing ethylene by its evaporation, unreacted vinyl ester is further removed from the ethylene-vinyl ester copolymerization system by, for example, a method that the ethylene-vinyl ester copolymer solution is continuously fed at a constant rate from an upper portion of a tower equipped with Raschig rings while gaseous organic solvent such as methanol is blown from bottom of the tower, and thereby allowing a distillate of mixed gas of the gaseous organic solvent and unreacted vinyl ester to flow out of the top. A final copolymer solution substantially free from the unreacted vinyl ester can be taken out from the bottom of the tower.

Alkali catalyst is added to the final copolymer solution absent vinyl ester, thereby saponifying the vinyl ester unit contained in the copolymer.

The saponification is performed in the presence of alkali or acid catalyst in the state of solution of the vinyl ester copolymer dissolving in alcohol or alcohol containing water. Examples of the alcohol include methanol, ethanol, propanol, tert-butanol or a like alcohol, and among them, methanol is preferred. The content of the vinyl ester copolymer in the alcohol is appropriately selected depending on viscosity of the solution, usually from the range of 10 to 60 wt %. As the catalyst for the saponification, alkali catalyst including hydroxide or alcoholate of alkali metal such as sodium hydroxide, potassium hydroxide, sodium methylate, sodium ethylate, potassium methylate, and lithium methylate; and acid catalyst including sulfuric acid, hydrochloric acid, nitric acid, methanesulfonic acid, zeolite, and cation exchange resin may be used.

The amount of the saponification catalyst is appropriately selected depending on saponification process, desired saponification degree and so on. In the case of using alkali catalyst, the amount ranges usually from 0.001 to 0.1 equivalent, preferably from 0.005 to 0.05 equivalent, based on the total amount of monomers including vinyl ester-based monomer and so on. Any saponification method such as batch saponification, continuous saponification on belt, and continuous saponification in tower may be employed according to a desired saponification degree. Saponification in tower under continuous pressure is preferably conducted because the method can reduce the amount of alkali catalyst for the saponification and can improve the efficiency of the saponification reaction.

An appropriate saponification pressure depends on an intended ethylene unit content of EVOH resin, and selected from the range of 2 to 7 kg/cm$^2$. The saponification temperature is selected from the range of 80 to 150° C., preferably 100 to 130° C. The saponification time is selected from the range of 0.5 to 3 hours. After the saponification, the obtained EVOH resin is neutralized, if necessary.

Thus produced EVOH resin is used as a raw material of pellets. Alternatively, an EVOH resin composition containing, besides thus produced EVOH resin, a common additive, for example, heat stabilizer, antioxidant, antistatic agent, colorant, ultraviolet absorber, plasticizer, light stabilizer, surfactant, insecticide, drying agent, anti-blocking agent, fire retardant, crosslinking agent, curing agent, foaming agent, crystal forming agent, anti-fogging agent, biodegradable agent, silane coupling agent, or oxygen scavenger, within the range not inhibiting the effect of the invention.

<Production of Pellet>

The molding material of the invention consists of EVOH resin pellets, which comprise a mixture of (1) a first EVOH resin pellet (A1) having an approximately circular or elliptical cross-section and (2) a second EVOH resin pellet (A2) having cylindrical shape.

(1) First EVOH Resin Pellet (Pellet A1)

The first EVOH resin pellet has an approximately circular or elliptical cross section. The pellet is round with no edges and therefore an arbitrary cross-section of the pellet is approximate circle or ellipse. Such pellet is usually produced by melt extruding EVOH resin and cutting it before solidifying. In the case that EVOH resin is melt-extruded and cut out with cutter into EVOH resin pieces while molten EVOH resin solidifies by cooling, the obtained EVOH resin piece droops at its cutting face and forms into droplet due to its surface tension till the EVOH resin piece solidifies. As a result, a round pellet without edge is obtained. Thus produced pellet is sphere, approximate sphere, lenticular or oval depending on the shape of EVOH resin melt-extruded. Common shapes of EVOH resin melt-extruded are rectangular or circular cylinder.

Size of the pellet A1 is not particularly limited, but the pellet Al has a maximum major axis (m) of its cross-section ranging from usually 3 to 6 mm, preferably 3.5 to 5.5 mm, particularly preferably 4.3 to 5.2 mm, and maximum minor axis (n) ranging from usually 2.5 to 6 mm, preferably 3 to 5.5 mm, particularly preferably 3.5 to 5.2 mm. Unduly large pellet is lowered in feed property, and unduly small pellet acts like powder and is lowered in handling property.

The ratio (m/n) of major axis (m) to minor axis (n) of the cross section is selected from the range of usually 1 to 2, preferably 1 to 1.8, particularly preferably 1 to 1.5. Unduly large ratio (m/n) means that the pellet shape is close to acicular, which tends to impair feed property in melt extrusion molding of the pellets. The ratio (m/n)=1 means that the pellet is perfect sphere.

As the raw material fed to a melt extruder for producing pellet A1 of EVOH resin, (1-1) a solution or slurry of EVOH resin as it is after saponification in producing process of EVOH resin, or water-containing EVOH resin composition obtained by properly adjusting water content of the solution or slurry of EVOH resin, alternatively (1-2) molten EVOH resin obtained by melting dry EVOH resin pellets produced by strand pelletizing process may be used.

(1-1) Case of Using Water-Containing EVOH Resin Composition as a Raw Material

In the case of using a water-containing EVOH resin composition as a raw material for pellets fed to an extruder, a preferable water-containing EVOH resin composition comprises 0 to 10 parts by weight of alcohol and 10 to 500 parts by weight of water, both based on 100 parts by weight of EVOH resin.

In the case of using a water-containing EVOH resin composition having a relatively high alcohol content, it is difficult to keep a safe environment of workplace or its surrounding area because of volatilization of alcohol in post-process. Water for cleansing pellets having a relatively high temperature for the purpose of removing alcohol are liable to cohere each other. On the other hand, pellets cleansing with water having a relatively low temperature makes cleansing time longer, resulting in lowering the efficiency of the production.

In the case of using a water-containing EVOH resin composition having a relatively high water content, molten EVOH resin piece immediately after being cut is liable to cohere each other, and produce ununiformly shaped pellets. Water-containing EVOH resin composition having a relatively low water content exhibits insufficient flowability, resulting in lowering productivity of pellets.

A method of adjusting water content of water-containing EVOH resin composition for pellets is not limited. In order to increase water content, spraying water to resin, immersing resin in water, contacting resin with vaporized water or the like can be employed. In order to decrease the water content, drying is appropriately performed. Drying can be performed with a hot air fluidized bed dryer or hot air ventilation dryer. The hot air fluidized bed dryer is preferably used from the viewpoint of reducing dried spots. In addition, drying temperature is 120° C. or less from the viewpoint of reducing thermal deterioration.

EVOH resin solution after saponification usually contains a large amount of alcohol, however, the alcohol content can be reduced by contacting the EVOH resin solution with vaporized water. Water-containing EVOH resin composition having a reduced alcohol content can be led out of the container to serve a raw material for manufacturing pellets.

In the case of feeding water-containing EVOH resin composition to an extruder as a raw material for pellets, the temperature of water-containing EVOH resin composition in the extruder is chosen from the range of preferably 70 to 170° C., more preferably 80° C. or more, further preferably 90° C. or more but 170° C. or less. If the temperature of water-containing EVOH resin composition is less than 70° C., EVOH resin would not be completely molten. If the temperature of water-containing EVOH resin composition exceeds 170° C., EVOH resin would be deteriorated due to heat. The temperature of resin composition in the specification is a temperature measured nearby discharging exit of extruder head with a temperature sensor set at the extruder cylinder.

The type of extruder is not limited, but the exit of the nozzle has a diameter of usually 1 to 10 mm, preferably 2 to 5 mm, from the viewpoint of handleability of pellets.

The number of blades of the cutter is usually from 2 to 24, preferably from 3 to 16.

The blades is preferably set in the manner that the blades contact with exit of dice of the extruder, that is to say, the dice-cutter distance may be 0 mm. However, the dice-cutter distance of 0.01 to 0.2 mm may be allowed.

The rotational frequency of the blades usually ranges from 500 to 2000 rpm, preferably 1000 to 1500 rpm.

The dimensions and shape of individual pellet are controlled by exit diameter of the nozzle, number of blades of the cutter, rotational frequency of the blades and the like.

The water-containing EVOH resin composition extruded through dice, in which EVOH resin is in molten state, is cut before the EVOH resin solidifies by cooling. This is called hot-cut pelletizing process. The hot-cut pelletizing process is classified into air hot-cut pelletizing where molten resin is cut in the air, and underwater pelletizing where molten resin is extruded into a chamber filled with cooling liquid and equipped with cutter and is cut underwater. Both pelletizing processes may be employed. The underwater pelletizing process can be carried out with underwater pelletizer.

The temperature of the cooling liquid in the underwater pelletizing is such a temperature that molten EVOH resin extruded does not solidify quickly in the chamber, and is selected from the range of preferably 30 to 90° C., more preferably 40 to 80° C., in the case of the molten EVOH resin coming into contact with cooling liquid before being cut.

The cooling liquid is not limited to water. Water/alcohol mixed solution; aromatic hydrocarbons such as benzene; ketones such as acetone and methyl ethyl ketone; ethers such as dipropyl ether; organic esters such as methyl acetate, ethyl acetate, methyl propionate, and the like may be used. Of these, water or water/alcohol mixed solution may be used because of handleability. As for the water/alcohol mixed solution, water/alcohol ratio in weight is usually from 90/10 to 99/1. Alcohol such as methanol, ethanol, or propanol can be used for the alcohol, and methanol is preferably used in industries.

(1-2) Case of Using Dry EVOH Resin Pellet as a Raw Material

In the case of using dry EVOH resin pellets used as a raw material of EVOH resin pellet (A1), the dry EVOH resin pellets are fed to a kneading extruder and melt-extruded.

Dry EVOH resin pellets used as the raw material has no limitation in their dimensions or shape.

EVOH resin temperature in kneading extruder should be set at a higher temperature than that of water-containing EVOH resin composition, for example, within the range of usually 150 to 300° C., preferably 200 to 285° C., particularly preferably 240 to 270° C. Less than 150° C. of the resin temperature would not completely melt EVOH resin pellets, but above 300° C. of the resin temperature would deteriorate EVOH resin due to such a high temperature. The EVOH resin temperature is a temperature measured nearby discharge exit of extruder head with a temperature sensor placed on the extruder cylinder.

The extruder to be used is not particularly limited, but a typical extruder having a nozzle with bore diameter of 1.0 to 5.0 mm, preferably 2.0 to 3.5 mm, from the viewpoint of handleability.

Die-face cutter, whose blades face the discharge exit of the dice corresponding to the dice-cutter distance of 0 mm, is commonly used, but the dice-cutter distance about from 0.01 to 0.2 mm may be allowed.

Blade number of the cutter is usually from 2 to 24, preferably from 3 to 16.

A common rotational frequency of blades is in the range of 1000 to 2000 rpm, preferably 1250 to 1750 rpm.

Pellet shape can be controlled by adjusting bore diameter of the nozzle, number of blades, rotational frequency of blades, and the like.

In hot-cut pelletizing process, EVOH resin melt-extruded is cut before solidifying by cooling. Pelletizing may be executed by either air hot-cut or underwater as is the case with using water-containing EVOH resin composition as raw material. The temperature of cooling liquid in underwater cut pelletizing process is in the range of usually 30 to 90° C., preferably 40 to 80° C. As the cooling liquid, not only water but also liquids listed in the case of using water-containing EVOH resin composition as raw material may be used.

(2) Cylindrical EVOH Resin Pellet (Pellet A2)

The second EVOH resin pellet (pellet A2) is cylindrical EVOH resin pellet, which has edges at the corner where circular or elliptical bottom surface and side surface meet and converge. A rod-shaped strand of EVOH resin solidifies by being cooled and cut at intervals of a given length into pellets whose cutting face has edges at the corner.

The bottom surface of the cylindrical pellet reflects the cross section of the strand, and therefore has a shape of circle or ellipse depending on the cross-sectional shape of the strand.

The diameter (x) of the bottom or upper surface of the pellet A2 is in the range of usually 1.5 to 4.0 mm, preferably 1.8 to 3.7 mm, more preferably 2.0 to 3.5 mm. The length (y) of the cylindrical pellet, corresponding to the cutting interval of the strand, is in the range of usually 1.5 to 4.0 mm, preferably 1.8 to 3.7 mm, more preferably 2.0 to 3.5 mm. If at least either diameter of the bottom surface or length is unduly large or unduly small, the molding material would exhibit deteriorated feed property in melt extrusion molding.

The ratio (x/y) between diameter (x) and length (y) of bottom or upper surface of the cylindrical pellet of EVOH resin (pellet A2) is in the range of usually 0.5 to 2.0, preferably 0.7 to 1.5, more preferably 0.9 to 1.2. If the ratio is unduly large or unduly small, the molding material would exhibit deteriorated feed property in melt extrusion molding.

The cylindrical pellet is produced as follows: EVOH resin solution is extended into coagulation bath through a nozzle, and converted into strand in the coagulation bath. The strand is cut into pellets, followed by being water-washed and optionally dried after contacting with aqueous solution of additives.

An EVOH resin solution prepared by dissolving EVOH resin in an appropriate solvent may be used of a raw material of the cylindrical pellets.

The EVOH solution used as the raw material may be prepared by i) dissolving powder or pellets of EVOH resin in solvent or solvent/water mixture in a desired concentration; ii) adjusting resin content or solution viscosity of EVOH resin solution after saponification in the production of EVOH resin by adding solvent or solvent/water mixture; or iii) dissolving water-containing EVOH resin pellets, which is obtained after being solidified and optionally water-washed in the production process of EVOH resin, in solvent or solvent/water mixture for adjusting a desired concentration and/or desired composition. The EVOH solution prepared by the process of ii) is preferably used from the viewpoint of industry.

The solvent capable of dissolving EVOH resin may be used for a solvent of the EVOH resin solution. The type of solvent or preparation method of the EVOH resin solution is not limited. Examples of the solvent include methanol, ethanol, propanol, phenol, dimethylsulfoxide (DMSO), dimethylformamide (DMF), hexafluoroisopropanol (HFIP) and a like solvent. An aqueous solution containing such solvent may be used as a mixture of solvent and water.

In the case of using EVOH resin aqueous solution as an EVOH resin solution, the mix ratio in weight (water/solvent) is preferably in the range of 80/20 to 5/95. The content of EVOH resin in the EVOH resin solution is in the range of usually 10 to 60 wt %, preferably 15 to 50 wt %. EVOH resin solution having unduly low content of EVOH resin becomes difficult to coagulate in the coagulation bath. EVOH resin solution having unduly high content of EVOH resin causes to reduce void content of the produced pellet, which affects thermostability adversely.

The EVOH resin solution is extruded through a nozzle into coagulant bath to obtain a strand. The configuration of nozzle exit is not limited, but cylindrical shape is preferred. Preferably the nozzle has a length of preferably 1 to 100 cm, more preferably 3 to 30 cm, and has an inner diameter of preferably 0.1 to 10 cm, more preferably 0.2 to 5.0 cm.

A die having a plurality of holes corresponding to nozzles may be used. In the case of using such die, from a few to hundreds of strands are obtained depending on number of the holes.

The temperature of the EVOH resin solution when being extruded into coagulation bath is in the range of usually 10 to 100° C., preferably 20 to 60° C. When being extruded, the EVOH resin solution having unduly low temperature might solidify before being discharged from the extruder, and the EVOH resin solution having unduly high temperature would solidify slowly, i.e. lowered coagulation property.

The liquid used in coagulation bath is required not to dissolve EVOH resin. Examples of the liquid include water, mixture of water and alcohol; aromatic hydrocarbons such as benzene; ketones such as acetone and methyl ethyl ketone; ethers such as dipropyl ether; organic esters such as methyl acetate, ethyl acetate, and methyl propionate. Of these, water or water/alcohol mixture having a ratio in weight of usually 5/95 to 99/1 may be used because of handleability. Alcohol such as methanol, ethanol, or propanol can be used for the alcohol, and methanol is preferably used in industries.

The temperature of the coagulation liquid when contacting EVOH resin solution with the coagulation liquid is in the range of preferably −10 to 40° C., more preferably 0 to 20° C. The coagulation liquid has a role of cooling and solidifying for obtaining strand, and therefore a preferable temperature of the coagulation liquid is relatively low from the viewpoint of shortening of coagulation time.

The residence time of EVOH resin in the coagulation bath is usually 10 to 400 seconds, preferably 30 to 200 seconds, particularly preferably 50 to 150 seconds. Unduly short residence time would cause slow solidification, i.e. lowered coagulation property, and unduly long residence time would result in lowered productivity.

Strand-like extrudate of EVOH resin solution in a coagulation bath is cooled and solidified by cooling liquid, and cut at a given intervals with cutter such as blade or rotating strand cutter, thereby producing cylindrical pellets each having a height equal to the interval of cutting.

(3) Post-Treatment

Thus produced cylindrical pellet, which has an approximately circular or elliptical cross section, is preferably water cleaned. In the case that the EVOH resin pellets may contain alkaline metal salt as a residue of the catalyst used in saponification for producing the EVOH resin, the pellets are preferably cleansed with water for the purpose of reducing coloration of the final molded product and so on.

Water cleansing is conducted in water bath set at a temperature of 10 to 60° C. For example, 100 parts by weight of EVOH resin pellets are cleansed with 200 to 1000 parts by weight, preferably 300 to 600 parts by weight of water, at a temperature of 20 to 50° C., preferably 25 to 35° C., for 0.5 to 5 hours, and this cleansing is executed from once to 5 times, preferably once. Such water cleansing can adjust properly the content of alcohol having 5 or less carbon atoms, acetic acid, and sodium acetate in EVOH resin, and can decontaminate oligomer or other impurities.

Preferably, such water cleansing reduces the contents: alcohol having 5 or less carbon atoms up to 0.0001 to 1 part by weight of, acetic acid up to 0.01 to 1 part by weight, and sodium acetate up to 0.01 to 1 part by weight, all contents based on 100 parts of EVOH resin pellets.

If necessary, EVOH resin pellets after water cleansing may allow to contact with aqueous solution of additives.

Examples of the additives include organic acids such as acetic acid, propionic acid, butyric acid, lauric acid, stearic acid, oleic acid, and behenic acid or alkaline metal (e.g. sodium or potassium) salt, alkaline earth metal (e.g. calcium or magnesium) salt, or zinc salt thereof; or inorganic acids such as sulfuric acid, sulfurous acid, carbonic acid, phosphoric acid, and boric acid, or alkaline metal (e.g. sodium or potassium) salt, alkaline earth metal (e.g. calcium or magnesium) salt, or zinc salt thereof, or a like thermostabilizer.

Of these, acetic acid, boron compound such as boric acid or salt thereof, acetate or phosphate is particularly preferably used.

Contacting with the aqueous solution of additives can make the additives contained in EVOH resin pellets, thereby improving physical properties of EVOH resin such as thermal stability during melt-molding.

Contacting with the aqueous solution of additives can be conducted from 1 to 3 times (preferably once) at a temperature of 10 to 80° C. (preferably 20 to 60° C., particularly preferably 30 to 40° C.) for 0.5 to 5 hours, by using aqueous solution of additives in a concentration of 3% or less (preferably 0.3 to 1.5%) by weight. The amount of the solution to be used is 200 to 1000 parts by weight, preferably 300 to 600 parts by weight based on 100 parts of EVOH resin pellets.

By making contact with an aqueous solution of additives, the contents are preferably adjusted: acetic acid is from 0.001 to 1 part by weight, boric compound is from 0.001 to 1 part by weight as an amount of boron, and acetate or phosphate including hydrogenphosphate is from 0.0005 to 0.1 part by weight as an amount of metal. The amount of boron is determined with ICP atomic emission spectroscopy after incineration of the boric compound. The amount of metal is determined with ICP atomic emission spectroscopy after incineration of acetate and phosphate including hydrogenphosphate.

Water-containing EVOH resin pellets are dried after thus adjustment of the respective contents of ingredients contained therein. The water content of EVOH resin pellets after being dried is usually 1 wt % or less, particularly 0.5 wt % or less.

Any drying method may be employed for drying the pellets. For example, centrifugal dryer, a perforated conveyor belt that travels across an air knife, ventilation dryer, or fluidized bed dryer, may be used. Multistep drying method with any combination of these may be conducted.

If necessary, an additive may be added to thus EVOH resin pellets, for example, antioxidant, antistatic agent, colorant, ultraviolet absorber, lubricant, plasticizer, light stabilizer, surfactant, insecticide, drying agent, anti-blocking agent, fire retardant, crosslinking agent, curing agent, foaming agent, nucleating agent, anti-fogging agent, biodegradable agent, silane coupling agent, or oxygen scavenger, within the range not inhibiting the effect of the invention.

<Preparation of Molding Material>

A molding material of the invention comprises a mixture of EVOH resin pellet (A1) and EVOH resin pellet (A2), both produced by the method described above.

EVOH resin constituting pellet has the same or different properties including ethylene unit content, saponification degree, and types or contents of additives, between pellet A1 and pellet A2

Mixing ratio in weight of pellet A1 to pellet A2, i.e. A1/A2, is in the range of usually 99/1 to 20/80, preferably 97/3 to 55/45, particularly preferably 95/5 to 80/20.

Unduly small mixing ratio tends to deteriorate feed property of the molding material in melt-extrusion molded. Unduly large mixing ratio would not provide an effect of cylindrical pellet with the molding material, resulting in lowering feed property in melt extrusion molding.

The pellet A1 and pellet A2 is mechanically or manually mixed by, for example, using mixer such as banbury mixer, or stirring or shaking by hand.

The molding material of the invention may contain a third EVOH resin pellet in addition to the mixture of EVOH resin pellets A1 and A2, within the range not inhibiting the effect of the invention. The third EVOH resin pellet differs from the pellets A1 and A2 in their shape or dimensions, or properties of EVOH resin such as ethylene unit content by percentage, saponification degree and types or contents of additives. The third EVOH resin pellet may be cylindrical pellet or round pellet obtained by pelletizing in melt state. Even if the molding material contains the third EVOH resin pellet, the mixing ratio in weight of pellet A1 to pellet A2, i.e. A1/A2, is preferably selected from the range of 99/1 to 20/80, preferably 97/3 to 55/45, more preferably 95/5 to 80/20.

According to the invention, a preferable molding material consisting of pellets described above satisfies the angle of repose less than 37°, preferably ranging from 30 to 36°, particularly preferably from 32 to 36°.

The angle of repose is defined as angle α in FIG. 1 which is the internal angle between the horizontal plane and the talus surface of conical pile of pellets 10 formed by pouring EVOH resin pellets onto the horizontal plane with use of funnel or the like.

As shown in FIG. 2, the conical pile is formed by pouring EVOH resin pellet 3 to the glass container 1 with 9.5 cm in inner diameter (D) and 2 cm in height placed on horizontal surface through the glass funnel 2 having a tip of 8 mm in diameter (a) set 10 cm upward from the upper face of the container 1 until the pellet slops over the container 1. The height (H) of the conical pile 10 of EVOH resin pellets formed on the horizontal surface of the container is measured and the angle of repose is calculated as arctangent according to the formula below.

$$\text{Angle of repose}(°)=\tan^{-1}(H/4.75)$$

The smaller angle of repose is, the more difficulty in piling the pellets have. That is to say, the pellets having smaller angle of repose is liable to slide, which would exhibit superior feed property. We guess that the molding material of the invention would become difficult to pile pellets densely because of their different shapes or dimensions, in other words, the pellets would be liable to slide rather than pile.

The molding material of the invention consisting of above-mentioned pellets exhibits excellent feed property. On the other hand, a molding material consisting of only round EVOH resin pellets having approximately circular or elliptical cross-section cannot exhibit satisfactory feed property. Even if a molding material is a pellet mixture of round pellet and cylindrical pellet, the molding material having an unduly large content of the cylindrical pellet exhibits deteriorated feed property.

<Use of Molding Material>

A molding material of the invention as constructed mentioned above, exhibits excellent feed property, and therefore is applicable to a molding material for a molded article of EVOH resin.

The molding material of the invention may be used as a material for melt-molding, especially an extrusion molding material for film, sheet, and fiber. As to the melt-molding process, extrusion molding process such as T-die extrusion, tubular film extrusion, blow molding, melt spinning and contour extrusion, and injection molding process are primarily employed.

The type of extruder is not limited as long as the different types of pellets melt and mix homogeneously during melt-kneading and extruding. Either screw or plunger type may be used for melt or plasticating zone, but screw type is preferably used. Either vertical extruder or horizontal extruder may be used, and either single or twin type screw may be used. The ratio L/D of length to diameter of the screw, i.e. screw length/screw diameter, as well as compression ratio (C) are not limited, but a common L/D ranges from 20 to 35, preferably 25 to 30, and a common C ranges from 1.5 to 8, preferably 2 to 5.

Melt-molding temperature is usually selected from the range of 150 to 300° C.

The film or sheet as it is may be molded into a variety of article. In general, the film or sheet is laminated with a certain substrate for increasing strength or imparting another function, and the resulting laminate is used. EVOH resin film or sheet, or a laminate thereof, produced from the molding material of the invention is utilized for packaging substance for food, industrial medicine, agricultural chemicals, and so on, because of the excellent gas-barrier property. The EVOH resin film, sheet or laminate may be post-molded into cup or bottle.

As the said substrate used for the lamination, a thermoplastic resin is used. Examples of the substrate include polyolefins such as polyethylenes including linear low density polyethylene, low density polyethylene, very low density polyethylene, medium density polyethylene, and high density polyethylene, polypropylene, ethylene-propylene block- or random-copolymer, copolymer of propylene and α-olefin having from 4 to 20 carbon atoms, polybutene and polypentene; graft modified polyolefins in which the aforementioned polyolefin is graft modified with unsaturated carboxylic acid or its ester, ionomer, ethylene-vinyl acetate copolymer, ethylene-acrylic acid copolymer, ethylene-acrylate copolymer, polyester-based resin, polyamide-based resin including copolyamide, polyvinyl chloride, polyvinylidene chloride, acryl-based resin, polystyrene, vinyl ester-based resin, polyester elastomer, polyurethane elastomer, halogenated polyolefins such as chlorinated polyethylene and chlorinated polypropylene, aromatic or aliphatic polyketone, and polyalcohols obtained by reducing these polymers. From the viewpoint of practical utility including physical property such as strength of the resulting multilayered structure, polyolefin-based resin and polyamide-based resin are preferably used, and polyethylene and polypropylene are particularly used.

As the other substrate, any substrate other than thermoplastic resin, for example, paper, metal foil, uni- or biaxial stretching plastic film or sheet, woven fabric, non-woven fabric, metal cotton, and wood may be used.

These substrate resin may contain a conventionally known additive such as antioxidant, antistatic agent, lubricant, nucleating agent, anti-blocking agent, ultraviolet absorber and wax within the range not inhibiting the effect of the invention.

A multilayered sheet or film comprising a layer of the molding material of the invention and substrate resin layer may be produced by a known lamination process. Examples of the lamination processes include extruding a substrate resin melt on the film or sheet of the molding material; extruding molten EVOH resin mixture on film or sheet of substrate resin; coextruding EVOH resin mixture and substrate resin; a process of assembling EVOH resin mixture (layer) and substrate resin (layer) using a known adhesive such as organic titanium compound, isocyanate compound, polyester-based compound, or polyurethane compound; coating a solution of EVOH resin mixture on a film or sheet of substrate resin, and then removing the solvent of the solution.

Of these processes, coextrusion is preferably employed from the viewpoint of cost and environment. The molding material of the invention may be applied to coextrude with another thermoplastic resin. Since the molding material has excellent film moldability and reduces the variation in film width during melt-extruding, the molding material is suitable for melt coextrusion with other thermoplastic resin to produce a multilayered structure.

The multilayered structure may be in the form of film, sheet, tape, bottle, pipe, filament, contour extrudate, and the like, but not limited thereto. The layer arrangement of the multilayer structure may be not only double layer arrangement of x/y but also y/x/y, x/y/x, x1/x2/y, x/y1/y2, y2/y1/x/y1/y2, and any other arrangement, wherein EVOH resin layer is denoted by x (x1, x2, . . . ), and the other substrate such as thermoplastic resin layer is denoted by y (y1,y2, . . . ). When the multilayered structure is a filament, bounding of two strips, core (x)-sheath (y), core (y)-sheath (x), eccentric core-sheath, and any other type structure may be employed.

Such a multilayered structure may be subjected to heat treatment, cooling treatment, drawing, printing, dry laminating, solution or molten liquid coating, bag making, deep drawing, box making, tube making, or splitting, according to necessity.

The multilayered structure may be utilized into articles having a variety of shapes. The multilayered sheet or film may be subjected to a hot drawing treatment for additional improvement of physical properties. Either monoaxial or biaxial drawing treatment may be applied. The higher the draw ratio is, the more improved the properties are. Relatively high draw ratio may provide a stretched film or sheet without pin hole, lack of uniformity, crack, or delamination.

In the drawing treatment, not only roll drawing, tenter drawing, tubular drawing, or blow drawing, but also deep forming, vacuum forming or a forming at high drawing ratio may be applied. Either simultaneous biaxial orientation or consecutive biaxial orientation may be employed for biaxial drawing process. The drawing temperature is selected from the range of 80 to 170° C., preferably 100 to 160° C.

After drawing treatment, heat setting is preferably executed with use of well-known means. Thus obtained stretched film or sheet is subjected to heat treatment at 80 to 170° C., preferably 100 to 160° C. for 2 to 600 seconds during keeping stretched.

In the case that a multilayered film or sheet is used for heat shrinking package for raw meat, processed meat, cheese and so on, a multilayered film or sheet after stretched but not heat set is used as a final film or sheet in the manner to wrap the raw meat, processed meat, cheese and so on. The wrapped substance is heated at a temperature from 50 to 130° C., preferably 70 to 120° C. for 2 to 300 seconds, thereby shrinking to complete tight packaging.

Thus obtained film, sheet or container is useful for a wrapping material for food, pharmaceutical preparations, industrial medicine, pesticide, and the like.

EXAMPLE

Hereinafter the present invention is described below based on examples, but the invention is not restricted by the examples unless exceeding the gist of the invention.

Incidentally, the unit "part" in the examples is on the basis of weight unless otherwise indicated.

[Production of molding material Nos. 1 to 11]

(1) EVOH resin pellet having approximately circular or elliptical cross-section (pellet A1)

Figure 3:
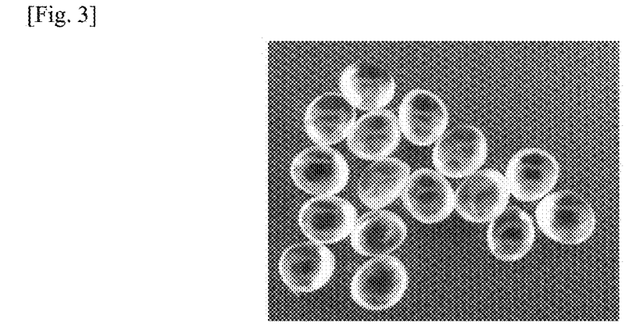
FIG. 3 is a photograph of appearance of EVOH resin pellets (A1) produced in example.
Figure 4:
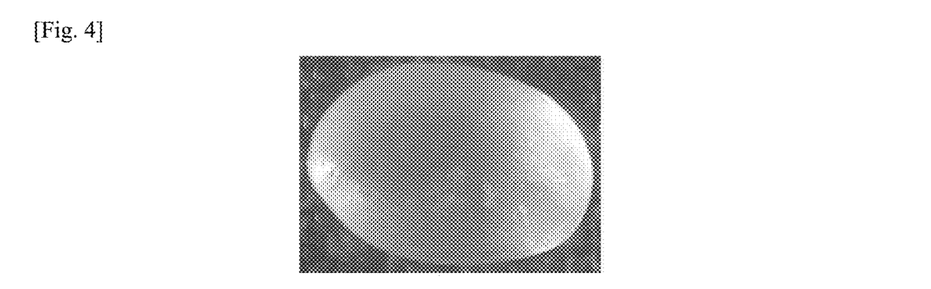
FIG. 4 is a photograph of cross-sectional view of pellet A1 produced in example, cut in direction along major axis of the pellet.
Figure 5:
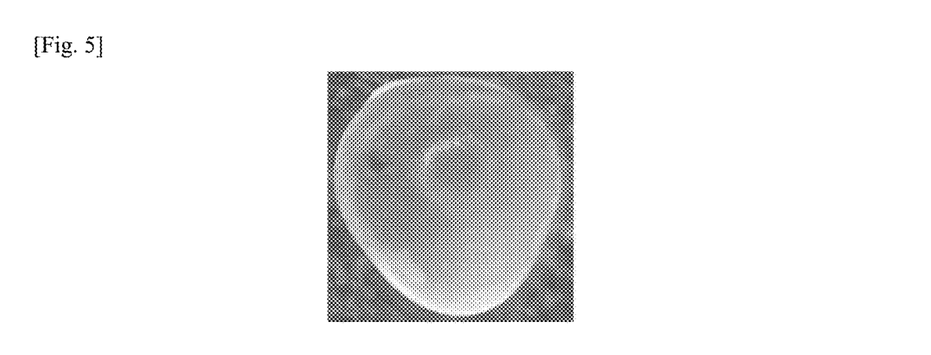
FIG. 5 is a photograph of cross-sectional view of pellet A1 obtained in example, cut in direction perpendicular to major axis of the pellet.

Cylindrical EVOH resin pellets having water content of 0.1% was used as a raw material for the pellet A1, wherein the EVOH resin has ethylene unit content of 29 mol %, saponification degree of 99.6 mol %, and MFR of 4.0 g/10 minutes (210° C., load of 2,160 g). The cylindrical EVOH resin pellets were fed to twin screw extruder and melt-kneaded and pelletized by underwater pelletizing process with the conditions mentioned below. The EVOH resin melt was extruded into cooling water and cut with cutter of 16 blades equipped on the exit when passing through the exit, thereby obtaining an oval EVOH resin pellet. The oval EVOH resin pellet has a cross-section of ellipse having maximum major axis of 4.6 mm and maximum minor axis of 3.5mm. FIGS. 3, 4 and 5 are photographs of appearance of the pellets, a cross section obtained by cutting the pellet A1 in direction along its major axis, and a cross section obtained by cutting pellet A1 in direction perpendicular to its major axis respectively.

It is understood from FIG. 3 that the oval EVOH resin pellet A1 having cross sections shown in FIGS. 4 and 5 has no edge, because EVOH resin pellets inclined at a variety of angles shown in FIG. 3 have no edges.

screw inner diameter: 70 mm
L/D: 39
screw rotational frequency: 300 rpm
die temperature: 260° C.
cylinder temperature (highest temperature): 260° C.
nozzle bore diameter: 3.2 mmφ
discharge amount: 350 kg/h
rotational frequency of cutter blade: 1500 rpm
cooling water temperature: 60° C.

(2) Cylindrical EVOH Resin Pellet (Pellet A2)

Figure 6:
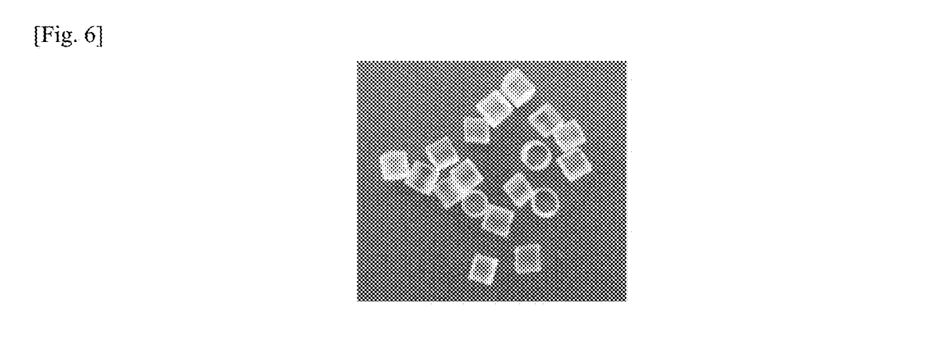
FIG. 6 is a photograph of appearance of EVOH resin pellets (A2) produced in example.
Figure 7:
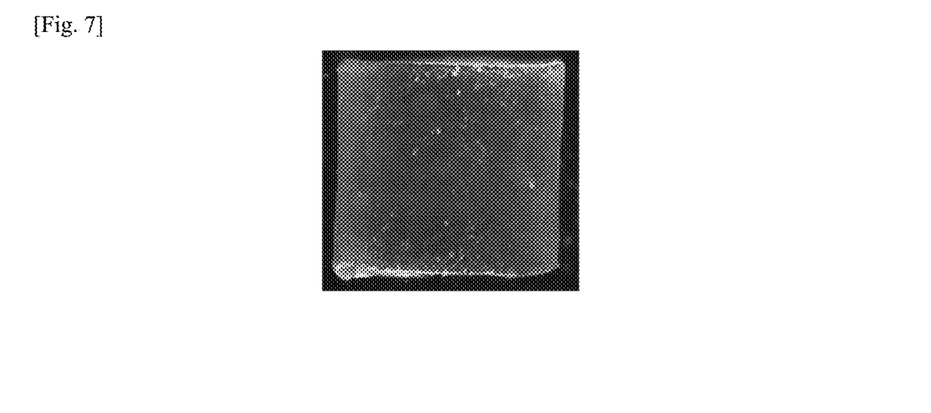
FIG. 7 is a photograph of cross-section of the cylindrical pellet A2 obtained in example, cut in direction along the height of the pellet.
Figure 8:
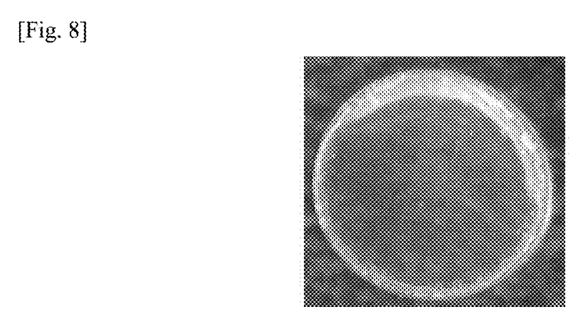
FIG. 8 is a photograph of cross-section of the cylindrical pellet A2 obtained in example, cut in direction parallel to bottom surface of the pellet.

Raw material used was EVOH resin solution having EVOH resin content of 45% in which EVOH resin having ethylene unit content of 29 mol %, saponification degree of 99.6 mol %, and MFR of 3.4 g/10 minutes (210° C., load of 2160 g) was dissolved in a mixture of water and methanol having a ratio in weight (water/methanol) of 40/60. The EVOH resin solution was pelletized by strand cutting process, in which the EVOH resin solution was extruded into coagulation bath (water/methanol mixture having a weight ratio of 95/5) kept at 5° C. through a cylindrical nozzle having 0.4 cm in inner diameter and 6.0 cm in length. The strand-like extrudate stayed in the coagulation bath for 100 seconds and then was cut with cutter and dried, thereby obtaining cylindrical EVOH resin pellets each having 2.5 mm in diameter of bottom and upper faces and 2.6 mm in height. FIGS. 6, 7, and 8 are photographs of appearance of the pellets, cross section of the cylindrical pellet obtained by cutting in direction along its height, and cross section of the pellet obtained by cutting in parallel with bottom face respectively.

(3) Molding Material (Pellet Mixture)

Molding material Nos. 1 to 9 was produced in the following manner: pellet A1 and pellet A2 both produced above were mixed at the weight ratio indicated in Table 1, and the obtained mixture was put in a plastic bag and shaken vigorously at 15° C. in air. Respective pellet A1 and pellet A2 were used alone as molding material Nos. 10 and 11.

Angle of repose of each molding material was measured according to the method below, and feed property of the molding material was evaluated.

[Measurement of Angle of Repose]

As shown in FIG. 2, approximately conical pile was formed by pouring EVOH resin pellet 3 onto the glass container 1 with 9.5 cm in inner diameter (D) and 2 cm in height placed on horizontal plane through the glass funnel 2 having a tip of 8 mm in diameter (a) set 10 cm upward from the upper face of the container 1 until the pellet slops over the container 1. The height (H) of the conical pile 10 of EVOH resin pellets formed, which was the distance between the bottom surface of the container 1 and the top of the pile 10, was measured and the angle of repose was calculated as arctangent according to the formula below. The measurement was conducted three times and the average value of the measurement values was employed as the angle of repose (α).

Angle of repose(°)=tan$^{-1}$(H/4.75)

[Production of EVOH Resin Film and Evaluation of Feed Property]

Thus prepared molding material Nos. 1 to 11 were formed into EVOH resin film having a thickness of 50 μm under the condition below.

(Condition of Film Forming)
screw inner diameter: 19 mm
L/D: 25
screw compression ratio: 2
T die: coat hanger type
die width: 150 mm
extrusion temperature (° C.): C1/C2/C3/C4/C5(adapter)/C6 (die)=200/230/230/230/230/230

Noise emitted from the extruder during producing EVOH resin film was heard at the standing position about 50 cm apart from the extruder, and feed property was evaluated based on the noise level.
○: almost no noise;
Δ: noise emitted but its level is not problematic; and
x: loud noise emission.

The lower the noise is, the better the feed property is.

TABLE 1

| Molding material No | Composition (amount: part) | | Angle of repose | Feed property |
|---|---|---|---|---|
| | Pellet A1 | Pellet A2 | | |
| 1 | 95 | 5 | 32 | ○ |
| 2 | 90 | 10 | 32 | ○ |
| 3 | 82.5 | 17.5 | 32 | ○ |
| 4 | 75 | 25 | 33 | ○ |
| 5 | 50 | 50 | 36 | ○ |
| 6 | 25 | 75 | 36 | ○ |
| 7 | 17.5 | 82.5 | 37 | Δ |
| 8 | 10 | 90 | 37 | Δ |
| 9 | 5 | 95 | 37 | Δ |
| 10 | 100 | 0 | 37 | Δ |
| 11 | 0 | 100 | 40 | X |

As shown in Table 1, the molding material No. 10 consisting of oval EVOH resin pellets as well as molding material No. 11 consisting of cylindrical EVOH resin pellets had relatively large angle of repose, and exhibited inferior feed property.

Molding material Nos. 7 to 9 were a pellet mixture of oval EVOH resin pellet (pellet A1) and cylindrical EVOH resin pellet (pellet A2), but did not have a lowered angle of repose because of unduly higher content of pellet A2. As a result, feed property of the molding material Nos. 7 to 9 were not improved.

Molding material Nos. 1 to 6 each was a pellet mixture of pellet A1 and pellet A2, and has mixing ratio (A1/A2) in weight of 25/75 or more. They had 36° or less of angle of repose and satisfactory feed property.

In particular, when the content of pellet A1 in the pellet mixture is was more than 50 wt %, the molding material had 35° or less of angle of repose and exhibited excellent feed property.

INDUSTRIAL APPLICABILITY

The molding material of the invention exhibits excellent feed property in melt extrusion molding and therefore is very useful in industry.

DESCRIPTION OF THE REFERENCE NUMERALS 3 pellet
10 piles of pellets

The invention claimed is:

1. A molding material consisting of saponified ethylene-vinyl ester-based copolymer pellets, the pellets comprising a first saponified ethylene-vinyl ester-based copolymer pellet (A1) having approximately circular or elliptical cross section, and a second saponified ethylene-vinyl ester-based copolymer pellet (A2) having a cylindrical shape,
   wherein the ratio (A1/A2) in weight of the first saponified ethylene-vinyl ester-based copolymer pellet (A1) to the second saponified ethylene-vinyl ester-based copolymer pellet (A2) is from 99/1 to 20/80.

2. The molding material according to claim 1, wherein the first saponified ethylene-vinyl ester-based copolymer pellet has a cross-section of appropriate circle or ellipse having major axis of 3.0 to 6.0 mm and minor axis of 2.5 to 6.0 mm.

3. The molding material according to claim 1, wherein the second saponified ethylene-vinyl ester-based copolymer pellet has 1.5 to 4.0 mm in diameter of its circular bottom face and 1.5 to 4.0 mm in height.

4. The molding material according to claim 1, having an angle of repose less than 37° of a conical pile of the pellets formed by pouring the pellets to a circular container having 9.5 cm in diameter through a funnel having 8 mm in diameter of its tip.

5. The molding material according to claim 1, wherein the first saponified ethylene-vinyl ester-based copolymer pellet has an ethylene unit content of 20 to 60 mol %, and the second saponified ethylene-vinyl ester-based copolymer pellet has an ethylene unit content of 20 to 60 mol %.

6. The molding material according to claim 2, wherein the second saponified ethylene-vinyl ester-based copolymer pellet has 1.5 to 4.0 mm in diameter of its circular bottom face and 1.5 to 4.0 mm in height.

7. The molding material according to claim 6, having an angle of repose less than 37° of a conical pile of the pellets formed by pouring the pellets to a circular container having 9.5 cm in diameter through a funnel having 8 mm in diameter of its tip.

8. The molding material according to claim 7, wherein the first saponified ethylene-vinyl ester-based copolymer pellet has an ethylene unit content of 20 to 60 mol %, and the second saponified ethylene-vinyl ester-based copolymer pellet has an ethylene unit content of 20 to 60 mol %.

9. The molding material according to claim 3, wherein the second saponified ethylene-vinyl ester-based copolymer pellet has 1.5 to 4.0 mm in diameter of its circular bottom face and 1.5 to 4.0 mm in height.

10. The molding material according to claim 9, having an angle of repose less than 37° of a conical pile of the pellets formed by pouring the pellets to a circular container having 9.5 cm in diameter through a funnel having 8 mm in diameter of its tip.

11. The molding material according to claim 10, wherein the first saponified ethylene-vinyl ester-based copolymer pellet has an ethylene unit content of 20 to 60 mol %, and the second saponified ethylene-vinyl ester-based copolymer pellet has an ethylene unit content of 20 to 60 mol %.

12. The molding material according to claim 1, wherein the first saponified ethylene-vinyl ester-based copolymer pellet is hot-cut pellet and the second saponified ethylene-vinyl ester-based copolymer pellet is strand-cut pellet.

* * * * *